United States Patent
Blankenship et al.

(10) Patent No.: US 7,208,697 B2
(45) Date of Patent: Apr. 24, 2007

(54) SYSTEM AND METHOD FOR MONITORING AND CONTROLLING ENERGY USAGE

(75) Inventors: George D. Blankenship, Chardon, OH (US); Seth Mason, Eastlake, OH (US)

(73) Assignee: Lincoln Global, Inc., City of Industry, CA (US)

( * ) Notice: Subject to any disclaimer, the term of this patent is extended or adjusted under 35 U.S.C. 154(b) by 337 days.

(21) Appl. No.: 10/850,536

(22) Filed: May 20, 2004

(65) Prior Publication Data
US 2005/0258154 A1    Nov. 24, 2005

(51) Int. Cl.
*B23K 9/095* (2006.01)
(52) U.S. Cl. .................. 219/130.21; 307/39
(58) Field of Classification Search ........... 219/130.01, 219/130.21, 130.33; 307/38, 39
See application file for complete search history.

(56) References Cited

U.S. PATENT DOCUMENTS

| | | | |
|---|---|---|---|
| 3,872,286 A * | 3/1975 | Putman | 705/412 |
| 4,060,709 A * | 11/1977 | Hanson | 219/130.33 |
| 4,075,699 A * | 2/1978 | Schneider et al. | 700/291 |
| 6,486,439 B1 | 11/2002 | Spear et al. | |
| 6,624,388 B1 | 9/2003 | Blankenship et al. | |
| 2003/0009265 A1 | 1/2003 | Edwin | |
| 2003/0050737 A1 | 3/2003 | Osann, Jr. | |

\* cited by examiner

*Primary Examiner*—Clifford C. Shaw
(74) *Attorney, Agent, or Firm*—Fay Sharpe LLP; Brian E. Turung

(57) ABSTRACT

A welding control system to monitor the energy consumption of a plurality of welders. The welding control system controls the operation of one or more welders based upon the energy information received from one or more energy monitoring devices.

94 Claims, 4 Drawing Sheets

SYSTEM AND METHOD FOR MONITORING AND CONTROLLING ENERGY USAGE

The present invention relates generally to the monitoring and controlling of equipment based upon actual and/or anticipated energy usage, and more particularly to a system and method of providing a welding architecture and/or a network architecture that enables control of one or more welders based upon actual and/or anticipated energy usage of the welders connected to the network.

INCORPORATION BY REFERENCE

U.S. Pat. Nos. 6,486,439 and 6,624,388 are incorporated herein by reference to illustrate a networked welding system that can be use in accordance with the present invention.

BACKGROUND OF THE INVENTION

The energy cost for businesses continues to rise. The energy costs for businesses are significant especially in the industrial sector wherein hundreds or thousands of kilowatt hours of power may be used daily. These energy costs are generally fixed costs that are passed on to the consumer by increasing the cost of a manufactured product. In a global economy, many businesses have been required to find ways to cut product costs in order to successfully compete in the marketplace. Some businesses have implemented automation to reduce overhead costs. However, the increased amount of machinery used to automate a particular manufacturing has resulted in increased energy usage. Although energy usage and cost has become an increased concern for residential, commercial and industrial consumers, there have been few options to reduce this cost.

Electrical rate structures vary for commercial and industrial customers. Billing terminology and contract terms can be complex and are often misunderstood. When estimating power costs, it is important to understand the billing structure for a particular customer. Even the most complex electrical billing schemes have the same basic features. All customers pay an "Energy Charge" for electrical consumption or the amount of electricity used. Usage is calculated in kilowatt-hours (kWh). The cost for direct consumption is based on a kilowatt-hours charge, and may be adjusted seasonally. Other direct and indirect consumption charges such as the "Fuel Cost Adjustment", the "Purchased Power Cost Recovery Factor", and the "Cogeneration Power Cost" may not always appear on the monthly utility bill, or may, for simplicity, be incorporated into the overall cost for consumption. The time of day when consumption occurs may also influence utility costs. Some electric utilities divide total consumption into peak and off-peak components and charge accordingly. Peak supply hours for a utility generally occur between the hours of 8 a.m. and 9 p.m. and the cost of energy to consumers during this time may be nearly double the off-peak cost. Calculating energy charges is relatively straightforward. For example, a customer which consumes 6 kilowatts (6000 watts) of electricity for 8 hours would use 48 kWh (6 kW×8 hours). If the energy charge for electricity is $0.05 per kWh, the cost of energy to the customer is $2.40 (48 kWh×0.05=$2.40).

In addition to the basic energy charges to customers, most commercial and industrial customers pay a "Demand Charge" for the maximum rate that energy is used. This charge covers the costs associated with maintaining sufficient electrical facilities at all times to meet each customer's highest demand for energy. This charge is based on the average amount of electricity used by the customer in a defined period within the billing period. The demand charge is expressed as a dollar per kilowatt (kW) and is applied to the customer's maximum kW demand, or the highest electrical usage the customer demanded from the power system during the month. For large power consumers, the utility customarily installs a meter that measures the customer's instantaneous demands over each 15 minute interval throughout the monthly billing cycle and calculates the customer's demand charge based on the highest 15 minutes of power use during that billing cycle. Of course, the same concept may be applied using other time intervals and some power companies use a 30-minute interval or other interval. A customer who turns on a system that consumes 100 kW, runs it for 15 minutes, and then shuts it off consumes 25 kWh. Another customer turns on another system that consumes only 50 kW and runs it for 30 minutes also consumes 25 kWh; however, the first customer demanded 25 kWh at a rate of 100 kW per half hour and the second customer demanded 25 kWh at a rate of 50 kW per half hour over a longer period of time. The first customer's demand, or rate at which that customer requires the electric power to be delivered, was twice that of the second customer. While both customers are charged for 25 kWh of energy, the first customer is charged for 100 kW of demand, while the second is charged for only 50 kW of demand. As a result, the first customer ends up paying more for the consumption of 25 kWh than the second customer. This cost different exists because it costs the power company more to serve the higher-demand customer, since power companies must have more facilities in place to serve the higher demand at any given moment. The demand charge reflects this higher cost and provides an incentive for customers to manage their loads to lower their demand.

Demand charges can be particularly high for large plants that have negotiated special utility rate contracts. In many parts of the country, utility capacity is highly stressed and over the last ten years, savvy utility companies have offered "cost reductions" to contract purchasers that were based on holding demands constant and have a very high penalty for additional growth. In some contracts where the demand charges are very high, the energy charge is actually a negative value meaning that the utility will pay the consumer to burn more power. Of course, this is offset by the demand charge in the favor of the utility. A "Ratchet Clause" may be included by the utility to penalize an unusually high monthly peak demand by applying that demand to the rate structure for 12 months after it occurs. Additional demand charges may be applied when an industrial site experiences a low Power Factor. This occurs when equipment inefficiently converts supplied power to other uses.

Industrial consumers that utilize electric arc welders in an assembly process to manufacture products (e.g., automotive industry) typically require significant energy demands and incur significant energy costs. In these industries, hundreds or perhaps thousands of welders are employed to drive multiple aspects of an assembly process, wherein sophisticated controllers enable individual welders to operate within relevant portions of the process. In many of these processes, an automated system is used to control the power and/or waveforms supplied to the electrode, movements or travel of a welding tip during welding, electrode travel to other welding points, gas control to protect a molten weld pool from oxidation at elevated temperatures and provide ionized plasma for an arc, and other aspects such as arc stability to control the quality of the weld. These welding systems are often deployed over great distances in larger manufacturing environments and many times are spread across multiple manufacturing centers. Given the nature and requirements of modern and more complex manufacturing operations, welding system designers have begun interconnecting multiple welding machines together to control the operation of such welders. In the past, many conventional welding systems operate in individually controlled and somewhat isolated manufacturing locations in regard to the overall assembly process. Thus, controlling, maintaining, servicing and supplying multiple and isolated locations in large centers, and/or across the globe, became very challenging, time consuming and expensive. In addition, the energy consumption of these remotely located welders was typically unknown. Conventional welding systems often require engineers and designers to travel to a plurality of different welding locations to manually change, and/or modify, a current production process. This may involve modifying programs associated with the control aspects of each welder, for example. After modifications have occurred, individual welders may then be tested at each location to verify one particular portion of the overall process. When the overall assembly operation is finally underway; however, it may be discovered that some individual welders need to be "tuned" or modified in order to integrate with other welding systems contributing to the process. This may involve sending a systems engineer to each welding location in a large assembly operation to modify an individual portion of the process. Moreover, systems engineers may adjust a particular welder in an isolated manner without knowing if the latest adjustment suitably integrates into the overall assembly process. This is both time-consuming and expensive. Another challenge facing welding systems relates to service and maintenance. Welders are often maintained and serviced according to procedures implemented by operators of the welding systems. Although some operators may adequately service and maintain these systems, quality of the service and maintenance is often up to the training and competence of the individual operator. Thus, a large collection of well-maintained welders servicing an overall assembly process may be at the mercy of another welding system that is not properly serviced or maintained. This may cause the process to stop or be disrupted during service outages relating to a poorly maintained welder. Even under the best of circumstances however, given that many welding systems are operating in an isolated manner, diagnostic information relating to the health of these systems is often not reported or discovered until after a breakdown occurs. Other challenges relating to conventional welding systems also existed.

Many of these challenges are addressed in U.S. Pat. Nos. 6,486,439 and 6,624,388, which are incorporated herein by reference. These two patents disclose a welding and network information system wherein one or more welders can be controlled and/or monitored at a remote location. U.S. Pat. No. 6,624,388 discloses a system and method that includes a welder operatively coupled to a server and a network interface to enable a network architecture to communicate with at least one remote system. The remote system includes at least one remote interface to communicate with the network architecture, wherein the remote system accesses at least one HTTP socket to establish web communications with the welder and loads at least one application from the welder. The remote system accesses at least one Welding Application socket via the at least one application to exchange information between the welder and the remote system, wherein the at least one application includes at least one of a weld configuration component, a weld monitoring component, and a weld control component to interact with the distributed welding system. The network architecture disclosed in the '388 patent provides a structure, protocol and remote communications interface between welders, and/or other remote systems, across internal networks and/or to broader networks such as the Internet. These systems can include machinery in a plant production line, supervisory systems, inventory systems, quality control systems and maintenance systems associated with the welders. Communications between these systems facilitate such activities as electronic commerce, distributed control, maintenance, customer support, and order/supply/distribution of welding materials. Thus, the networked and distributed welding architecture disclosed in the '388 patent promotes a higher-level integration to achieve improved quality, productivity, and lower cost manufacturing. The '439 patent discloses welding and network information system that includes a welder operatively coupled to a server and a network interface to enable a network architecture to communicate with at least one remote system, wherein the remote system includes at least one remote interface to communicate with the network architecture and provide welding information to a user. The remote system accesses at least one HTTP socket to establish web communications with the welder and loads at least one application from the welder. The remote system accesses at least one Welding Application socket via the at least one application to exchange information between the welder and the remote system. The at least one application includes at least one welding information broker to determine whether the welding information in a local database is to be updated, the user receives the welding information via the remote interface and the local database or the remote interface and the network. As such, the '439 patent discloses a system that enables automated order and fulfillment of items such as replacement parts and/or welding programs and procedures.

Although the '439 patent and '388 patent significantly enhance the operation of multiple welders via a network, these patents do not address the power consumption of a plurality of welders to enable an operator to control and/or reduce the energy costs associated with the operation of such welders. Due to the increased energy costs, there is an unsolved need for an improved welding architecture to facilitate the monitoring and/or control of multiple welding systems to reduce the energy cost associated with the operation of such welders.

SUMMARY OF THE INVENTION

The present invention is directed to the monitoring and controlling of equipment based upon actual and/or anticipated energy usage to thereby regulate or control the costs associated with the operation of such equipment, and more particularly to a system and method of providing a welding architecture and/or a network architecture that enables control of one or more welders based upon actual and/or anticipated energy usage of the welders. The present invention is particularly directed to the control of a plurality of welders and will be described with particular reference thereto; however, the invention has a broader scope and can be applied to other and or additional industrial equipment and/or energy consuming devices. For instance, the present invention could be expanded to monitor and control welders and other electrical energy consuming equipment at a manufacturing facility so as to regulate and/or control the energy consumption at a particular facility. As can be appreciated, the invention can applied in many other ways to monitor and/or control the energy consumption at a facility. The following description of the invention presents a simplified summary of the invention in order to provide a basic understanding of some aspects of the present invention. This summary is not an extensive overview of the invention. It is intended to neither identify key or critical elements of the invention nor delineate the scope of the invention. Its sole purpose is to present some concepts of the invention in a simplified form as a prelude to the more detailed description presented later.

As set forth above, the present invention relates to a system and method to monitor and/or control energy consumption of a plurality of energy consuming devices. The invention is particularly directed to industrial consumers and more particularly to industries that utilize large numbers of automated welding machines. The invention is applicable to other types of businesses and to residential consumers. The basic premise of the present invention is to monitor and/or control the consumption of energy by a plurality of devices, and to activate, deactivate and/or delay operation of one or more devices based upon the current and/or anticipated consumption of energy by one or more devices. As stated above, the present invention is particularly directed to an industrial consumer that utilizes a large number of welders in a manufacturing process. A group of the welders or all of the welders are connected to an automated or semi-automated control system. The power consumption of each of the welders and/or a group of the welders is monitored. The amount of power being consumed by one or more welders can be used to determine whether additional welders can be brought on line, whether certain welders should be shut down, etc. This determination can be based on a power consumption directive or profile that has been set or programed into the controller. As can be appreciated, the control of power consumption is equally applicable to other types of consumers. For instance, a residential consumer can have a "smart home" monitor all the power consuming devices or the primary power consuming devices in a home (e.g. air conditioner, heater, refrigerator, washer, dryer, dishwasher, lights, etc.). A power controller can then be used to determine whether a device should be activated and/or deactivate based on the present consumption of energy in the home. Similar energy control models can be used for residential buildings, commercial buildings, etc.

In another and/or alternative aspect of the present invention, there is provided a system and method to control energy consumption of one or more power consuming devices wherein the controller for such devices manages the power consumption by such devices based upon one or more control criteria. The control criteria can include, but is not limited to, the energy charge per kilowatt hour of energy used based upon the time of day and/or time of year, the demand charge for the maximum rate of energy used during an energy billing period, the priority or precedence of operation of a particular energy consuming device in a production process, production criteria for a particular energy consuming device in a production process, maximum allowable energy consumption for a particular time period, actual and/or anticipated energy costs during a particular period, the time of day, the month, inventory levels, production quotas, malfunctioning equipment, etc. As can be appreciated, the energy control system can be as simple as maintaining the energy consumption of a plurality of devices below a certain energy threshold or can be as complicated as controlling a production line of a manufacturing facility based upon inventory levels, production quotas, times of the day or month, anticipated power usage of one or more devices when activated, anticipated amount of power usage decrease when one or more devices is deactivated, etc.

In accordance with still another and/or alternative aspect of the present invention, there is provided a network architecture that is used to connect a plurality of devices together and to monitor and/or control one or more functions or operations of the device. The network architecture provides a structure, a protocol and/or a remote communication interface between one or more devices, between one or more remote systems, across internal networks and/or across external networks (e.g., World Wide Web). As stated above, the invention is particularly directed to a system of welders; but the invention can be used to monitor and/or control other and/or additional energy consuming devices. When the invention is used in association with welders, the energy monitoring and/or control system can be used in conjunction with other systems such as, but not limited to, machinery in a plant production line, supervisory systems, inventory systems, quality control systems and maintenance systems associated with the welders. Communications between one or more of these systems facilitates such activities as electronic commerce, distributed control, maintenance, customer support, and order/supply/distribution of welding materials. In one embodiment of the invention, the energy monitoring and/or control system of the present invention can be used in conjunction with an integrated network system as disclosed in U.S. Pat. Nos. 6,486,439 and 6,624,388, which are incorporated herein by reference. Thus, the networked and distributed welding architecture improves upon conventional and somewhat isolated welding systems in favor of higher-level integration to achieve improved quality, productivity, and lower cost manufacturing.

In accordance with yet another and/or alternative aspect of the present invention, there is provided a network server (e.g., web server) and a network interface associated with a plurality of devices (e.g., a plurality of welders, etc.) that enables a networked architecture of devices and/or other networked systems to provide remote functionality within distributed devices. This functionality can include remotely monitoring, coordinating and/or controlling a plurality of devices (e.g., welders and/or network of welders) according to a higher-level command and control system in order to facilitate an overall process (e.g., manufacturing process, etc.). Multiple devices that are distributed over large areas may be configured and controlled from a remote system without having to access and travel to the location of each device. Remote monitoring of the device and/or a process involving the use of the device can be provided as feedback in the control and coordination of one or more devices and/or can be used to monitor energy consumption of one or more devices and/or control the operation of one or more devices. In one embodiment of the invention, the network interface can utilize one or more public domain and/or custom sockets designed for welding communications along with a weld communications protocol to interact with the welder via the network. A configuration component can also be provided to enable remote configuration of the welding system via the network interface. Configurations can include programs and/or firmware associated with a weld controller, as well as configurations relating to other welding system and/or operating procedures. A remote interface can also be provided that may reside within a browser or other or additional location to enable a user to interact with the distributed welding process via the network server and interface. The remote interface can include monitoring and configuration aspects that enable a user to remotely configure, monitor and/or control a plurality of welders and/or other devices of a manufacturing facility. A security component can also be provided in order to encrypt, authenticate and/or authorize remote welding communications and control over public networks such as, but not limited to, the Internet. The networked architecture can enable the overall system of welders to be supplied and maintained. Welding supplies associated with the welders may be monitored either automatically and/or manually from remote systems to facilitate monitoring perishable/replacement items relating to the welder. Such networked architecture systems are disclosed in U.S. Pat. Nos. 6,486,439 and 6,624,388, which are incorporated herein by reference.

In accordance with still yet another and/or alternative aspect of the present invention, there is provided one or more devices to monitor and/or measure the amount of a resource being consumed by a particular device. The device used to monitor and/or measure the amount of energy consumption by one or more welders and/or other energy consuming devices can be designed to measure and/or monitor one or more parameters of a consumed energy over one or more periods of time. Such parameters include, but are not limited to, voltage, the current frequency, maximum current level, minimum current level, average current level, kWh, maximum consumption, minimum consumption, average consumption, etc. Any increment of measurement can be made (e.g., energy consumed per second, energy consumed per minute, energy consumed per hour, energy consumed per day, etc.). This measured and/or monitored information by the monitoring device can be correlated to a variety of parameters such as, but not limited to, 1) a time period (e.g., time or day), day, portion of day (e.g., morning, afternoon, etc.,), month, portion of month (e.g., beginning or month, end of month, etc.), year, portion of year (e.g., summer, winter, fall, spring, etc.), decade, century; 2) the identity of the resource consuming device (e.g., particular welder, etc.) being monitored by the monitoring device in a particular location (e.g., factory A, warehouse B, etc.); 3) the identity of the energy consuming device (e.g., welder 1, conveyor A, lights in room A, etc.) being monitored by the monitoring device; and/or 4) the energy cost (e.g., average cost, cost during the peak use period, etc.). As can be appreciated, the identity information of a particular resource energy consuming device can be automatically detected by the monitoring device, and/or manually inputted in the monitoring device. The energy monitoring device can be incorporated in the energy consuming device (e.g. welder, etc.) and/or be connected in line with the energy consuming device. The energy monitoring device can include one or more arrangements designed to transfer information from the energy monitoring device to one or more controllers. Such transfer can occur via CD, DVD, floppy disk, memory stick, fire wire, IR transmitter, RF transmitter, laser light transmitter, microwave transmitter, phone line, computer cables, thin net, token ring, ethernet, electric wires, fiberoptic cable, USB cable, coaxial cable, etc. The energy monitoring device can be designed to directly and/or indirectly provide information to, and/or receive information from one or more central data processing and/or storage facilities (e.g., desktop computer, laptop computer, network computer, tablet computer, PDA, Palm Pilot, internet, proprietary computer bank, proprietary data base, etc.). The information transferred to the one or more central data processing and/or storage units and/or data being transferred from the one or more central data storage and/or processing units can be continuous feed, periodic feed, and/or be manually inputted. The data that is downloaded into the one or more central data processing and/or storage devices can include one or more software programs to enable an operator to monitor various energy consumption parameters obtained from one or more energy monitoring devices. The one or more software programs can be used to provide graphs, charts, tables, and/or the like used generate information on the energy consumption of one or more energy consuming devices that are integrated, connected and/or interconnected with one or more energy monitoring devices. This data can be used by a user to monitor, estimate and/or project the cost of operating one or more energy consuming devices. This information can be used to assist a user in obtaining cost information and/or estimated cost information on the operation and/or use of one or more energy consuming devices. The information obtained can also and/or alternatively be used by a user to modify the amount and/or time of use of one or more energy consuming devices. This information can also and/or alternatively be used to reduce the energy costs associated with the operation of one or more energy consuming devices. In still another and/or alternative embodiment of the invention, the one or more software programs used to process the information downloaded and/or received from one or more energy monitoring devices can be used to provide historical information on one or more parameters associated with one or more energy consuming devices. This information could be used to inform and/or notify a user that a certain amount of usage (e.g., too much, too little, use an improper times, etc.) of one or more energy consuming devices has occurred to thereby facilitate in monitoring the proper operation of an energy consuming device and to determine a whether maintenance or service is required for a particular energy consuming device. The transfer of information between one or more energy monitoring devices and/or one or more central data processing and/or storage devices can be automatic and/or manually instituted. The transferred information can occur continuously, at discrete periods of time, and/or after one or more triggering events have occurred (e.g. power outage, power surge, activation and/or deactivation of one or more circuit breakers, manual command by an operator, etc.). The information used by the one or more software programs can be manually inputted, and/or downloaded from one or more sources.

It is an object of the present invention to provide a monitoring and controlling method and system to thereby regulate or control the costs associated with the operation of energy consuming equipment.

It is another and/or alternative object of the present invention to provide a welding architecture and/or a network architecture that enables control of one or more welders based upon actual and/or anticipated energy usage of the welders.

It is still another and/or alternative object of the present invention to provide a welding architecture and/or a network architecture that can be used to reduce the energy cost associated with a plurality of welders.

It is yet another and/or alternative object of the present invention to provide a welding architecture and/or a network architecture that controls the operation of a plurality of welders based on one or more predefined energy parameters.

These and other objects and advantages of the invention will become apparent to those skilled in the art upon reading and following this description taken together with the accompanying drawings.

BRIEF DESCRIPTION OF THE DRAWINGS

Reference may now be made to the drawings which illustrate various embodiments that the invention may take in physical form and certain parts and arrangements of parts wherein.

DESCRIPTION OF PREFERRED EMBODIMENTS

Figure 1:
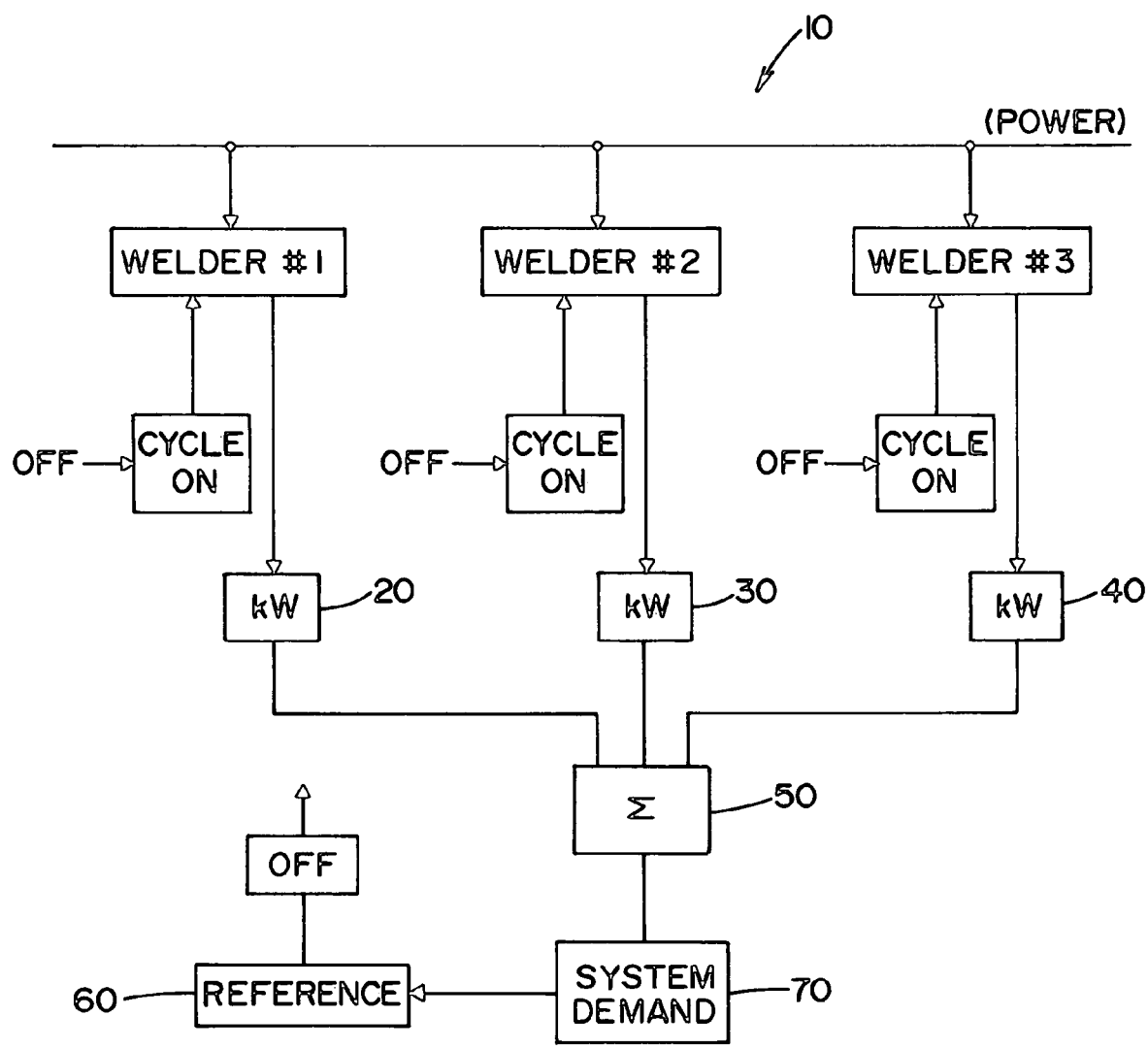
FIG. 1 is a schematic block diagram illustrating a distributed welding architecture in accordance with an aspect of the present invention.

Referring now to the drawings, wherein the showings are for the purpose of illustrating the preferred embodiments of the invention only and not for the purpose of limiting the same, FIG. 1 illustrates an energy monitoring system 10 in accordance with the present invention. FIG. 1 illustrates three welders, welder #1, welder #2 and welder #3 being supplied power from a power source. As can be appreciated more welders or less welders can be monitored by the energy monitor system of the present invention. Typically, the power supplied to the welders is provided a local power supplier; however, some or all of the power could be supplied by cogeneration at a particular facility. Each of the welders are connected with or integrated with an energy monitoring device 20, 30, 40. The energy monitoring devices monitor the amount of energy consumed by each welder in kW over a particular period of time. The amount of energy being used by each welder is transmitted to a summation device 50 which totalizes the energy being used by the three welders. The totalized amount of energy is compared to a reference demand level 60 by use of a system demand controller 70. If the system demand controller determines that the totalized energy consumption is equal to or exceeds a predefine energy consumption threshold, the controller generates a signal that is used to cycle off one or more of the welders. The controller can be designed to automatically cause one or more welders to cycle off or cause a signal to be generated to inform one or more operators to manually cycle off one or more welders. The controller can also be designed to generate a signal that is used to cycle one or more welders when the totalized energy consumption is equal to or less than a predefine energy consumption threshold. The controller can be designed to automatically cause one or more welders to cycle on or cause a signal to be generated to inform one or more operators to manually cycle on one or more welders.

Figure 2:
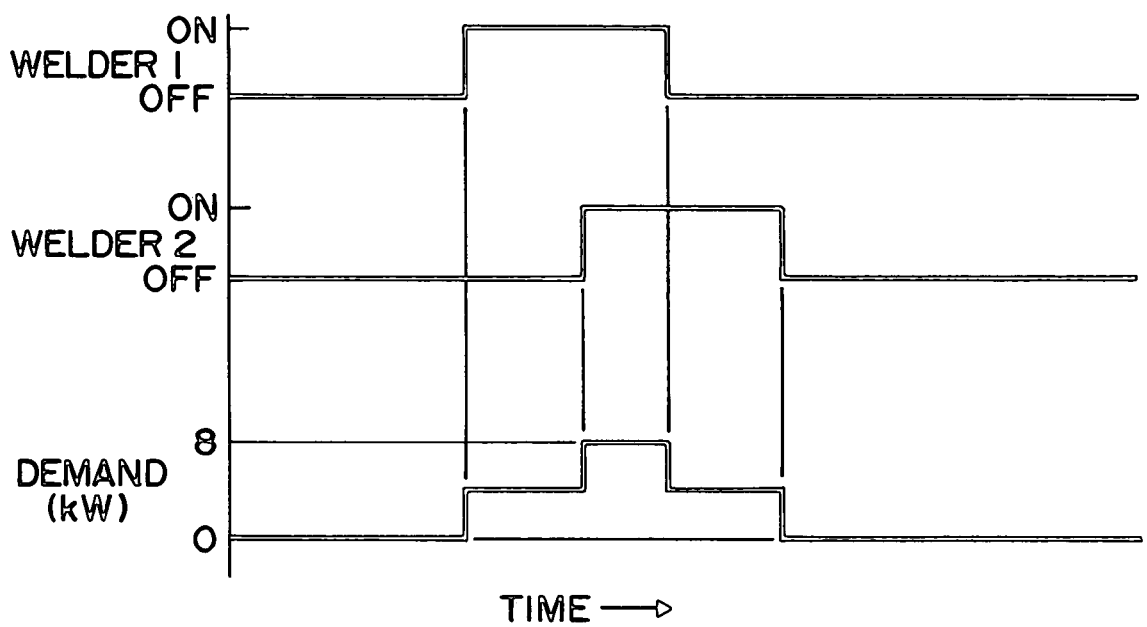
FIG. 2 is an energy graph illustrating the total energy consumption of two welders when partially operated together over a period of time.
Figure 3:
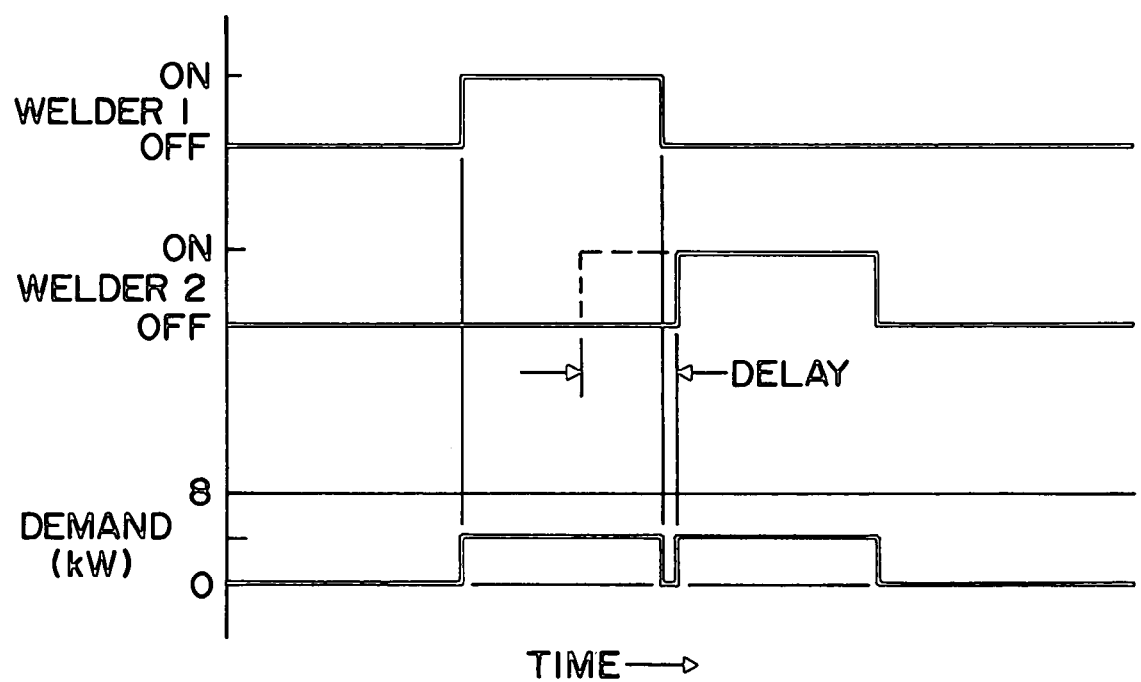
FIG. 3 is another energy graph illustrating the total energy consumption of two welders when operated at staggered intervals over a period of time.

Referring now to FIGS. 2 and 3, there is illustrated the load profiles of two welders. As shown in FIG. 2, welder 1 and welder 2 cycle in an on position over a certain period of time. The demand graph illustrates that when welder 1 and welder 2 are cycled on at the same time, the demand over such a period is doubled. When welder 1 initially cycles from the off position to the on position, welder 1 is indicated as drawing approximately 4 kW of power. Similarly, welder 2, when cycling from the off to the on position, also is indicated as consuming about 4 kW of power. As illustrated by the demand graph, when welder 1 initially cycles on, the demand is only 4 kW; however, when welder 2 cycles from the off to the on position at the same time as when welder 1 is in the on position, the demand load increases from 4 kW to 8 kW. When welder 1 cycles to the off position, the combined demand of welder 1 and welder 2 drops to 4 kW as illustrated by the demand graph of FIG. 2. As a result, during the operation of welder 1 and welder 2, a maximum demand of 8 kW occurs. Referring now to FIG. 3, the operation of welder 1 and welder 2 are staggered so that welder 1 is cycled in the off position while welder 2 is cycled in the on position. The demand graph illustrates that the maximum demand during the operation of welder 1 and welder 2 does not exceed 4 kW of power even though the time of operation of welder 1 and welder 2 in FIG. 3 is the same time of operation of welder 1 and welder 2 in FIG. 2. The simple delay in the operation of welder 2 until welder 1 cycles into the off position results in the maximum demand during the operation of the two welders to not exceed 4 kW. Since the energy charge to a user is in part based upon the maximum demand that is incurred during a particular billing period, the energy charge to the user for operating welders 1 and 2 as illustrated in FIG. 2 would be greater than the charge for operating welders 1 and 2 as illustrated in FIG. 3, since the maximum demand in FIG. 3 is less than the maximum demand in FIG. 2.

Figure 4:
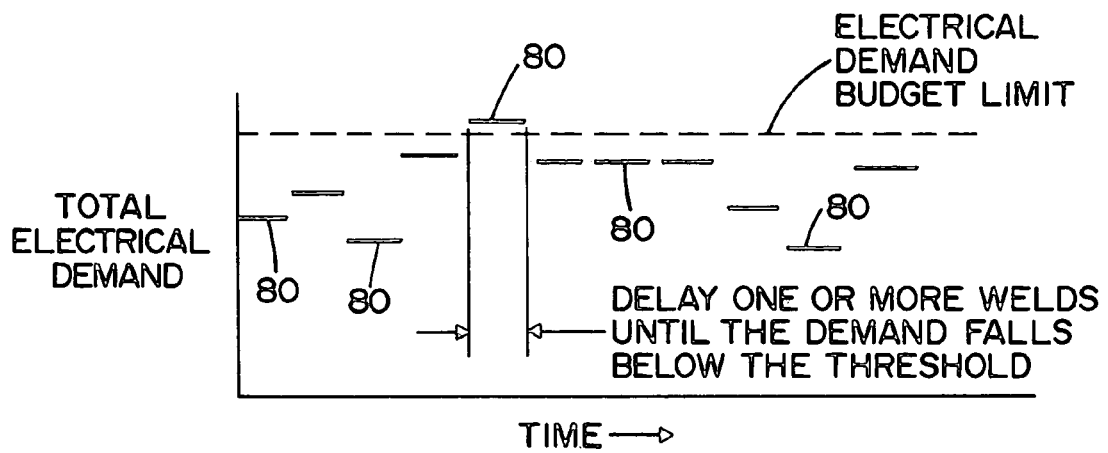
FIG. 4 is an energy graph illustrating the total energy consumed by a plurality of welders over a period of time relative to a maximum energy threshold.

Referring now to FIG. 4, another graph illustrating total electrical demand over time is illustrated. In this graph, each of the demand levels 80 represent the summation of energy being consumed by a plurality of welders. The dotted line represented in the graph is an electrical demand budget limit. As shown in FIG. 4, most of the total electrical demand levels for the plurality of welders fall below the electrical demand budget limit. However, it is illustrated that one of the total demand values exceeds the electrical demand budget limit level. When this occurs, the system demand controller 70 causes one or more of the welders to cycle from the on to the off position so as to cause the total electrical demand of the welders at any one time period to be maintained below the electrical demand budget limit. When the system demand controller determines that one or more welders that are currently in the cycle off position can be returned to the cycle on position without resulting in the total electrical demand exceeding the electrical demand budget limit, the controller can be designed to generate a signal which automatically causes one or more welders to cycle from the off to the on position or cause a signal to be generated to notify one or more users to cycle one or more welders from the off to the on position. By maintaining this electrical demand control structure, the total electrical demand for the operation of a plurality of welders can be controlled such that the total demand does not exceed a certain maximum demand value, thereby resulting in a lower energy cost for operating the welders.

Figure 5:
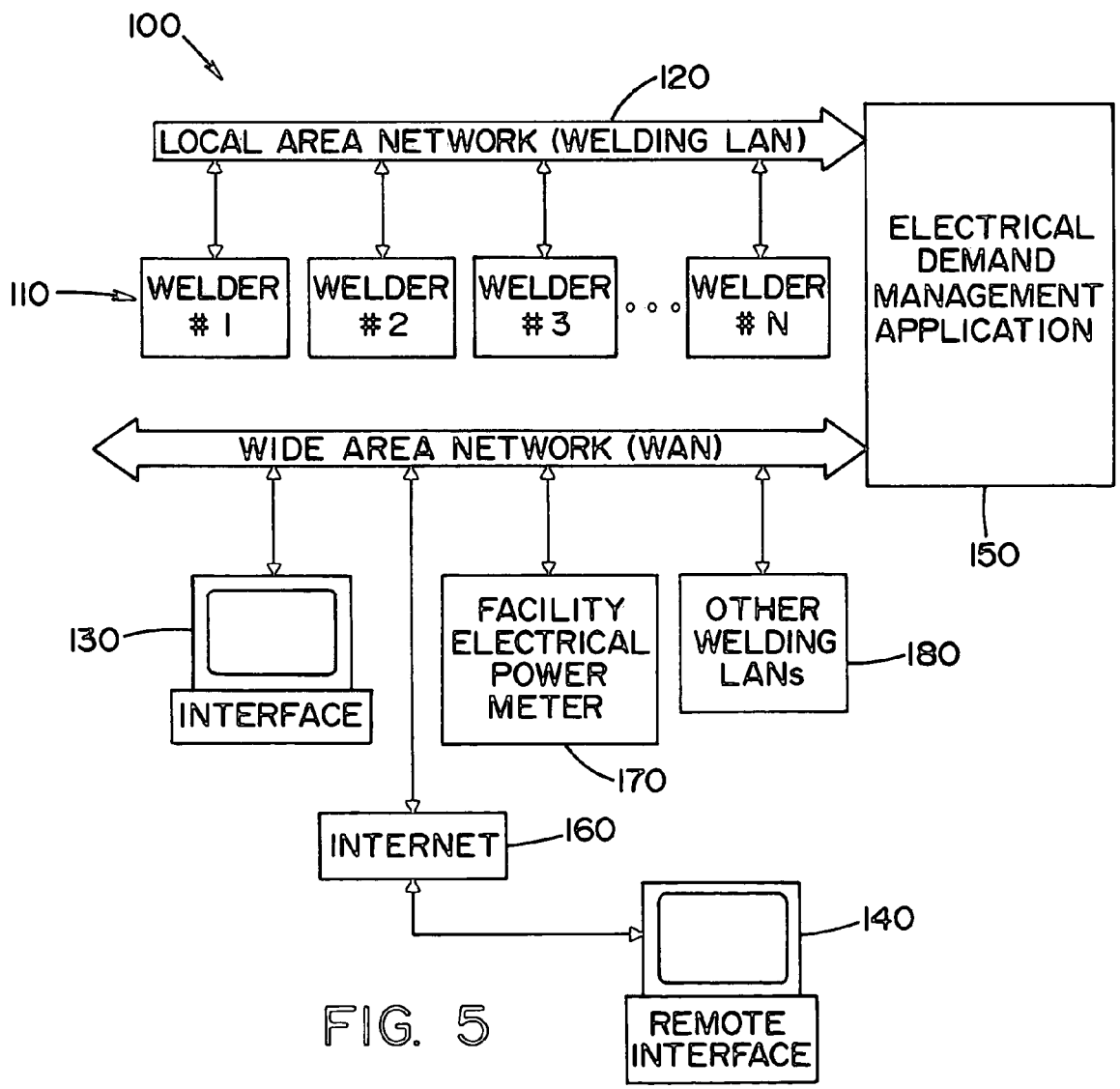
FIG. 5 is a schematic block diagram illustrating a welding network in accordance with an aspect of the present invention; and, FIG. 6 is a flow chart diagram illustrating a methodology providing a distributed welding architecture in accordance with an aspect of the present invention.
Figure 6:
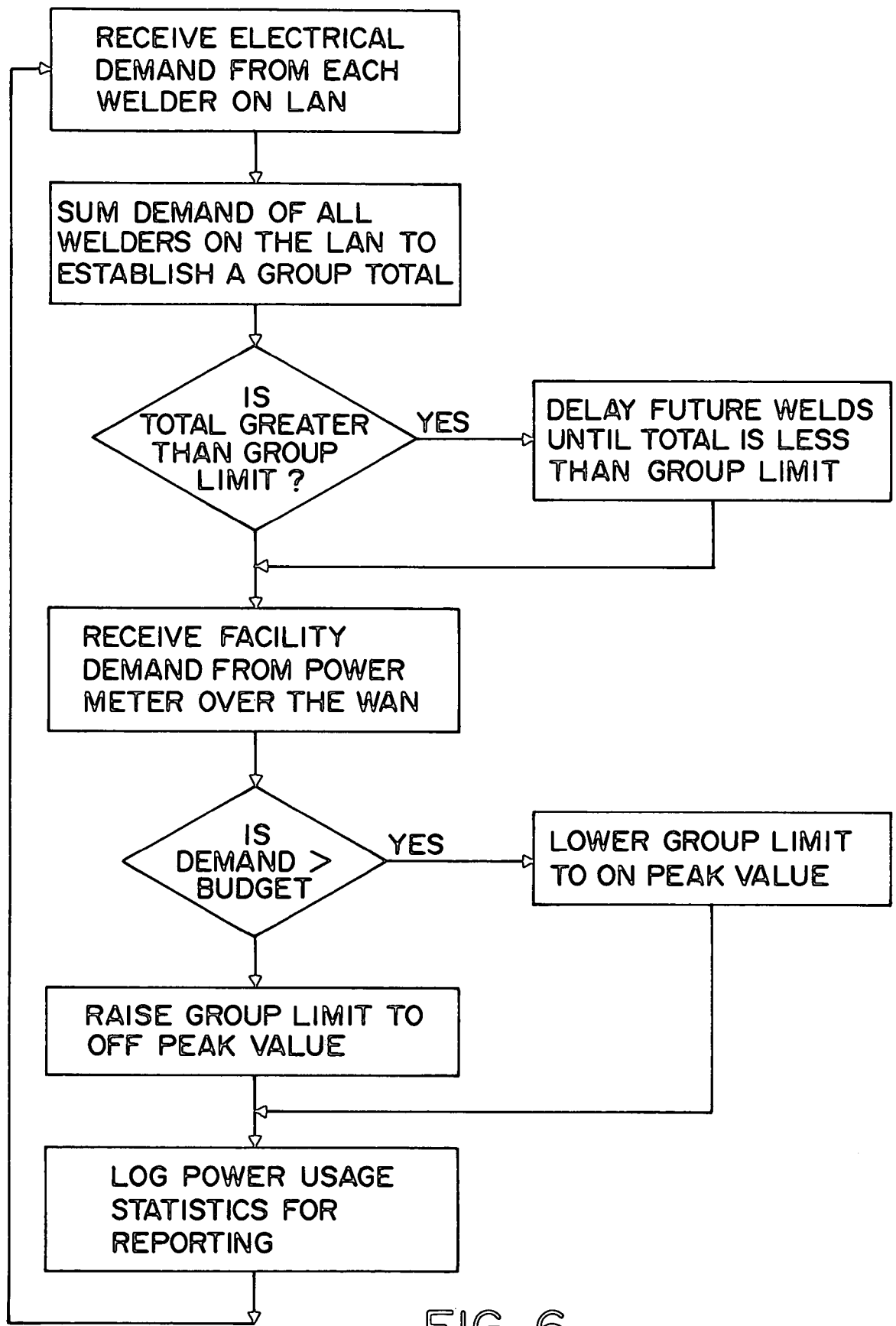

Referring now to FIGS. 5 and 6, an electrical demand management control system which integrates the operation of a plurality of welders via a network is illustrated. The system and methodology to provide a distributed welding architecture as illustrated in FIGS. 5 and 6 wherein a plurality of welders are controlled, monitored and/or configured via a higher-level network architecture can be used to effectively monitor and/or control the energy consumption of a plurality of welders. A network server and associated interface are operatively coupled to a welder to enable the distributed welding architecture as shown in FIG. 5. The network server executes a plurality of functional objects to interact with various portions of the welding process. These objects can be invoked from a remote system via network sockets adapted to the welder and associated with the network server and the objects. The remote system and/or other welding system may "bootstrap" components and/or applications for interacting with the functional objects provided by the network server. These components may include a monitoring component, a configuration component, a control component, and/or a business transaction component. A command and interface welding protocol can be provided to facilitate network control and/or monitoring of individual welders, wherein the protocol communicates status and/or control information to and/or from remote systems over the network thus enabling control of a plurality of distributed welding systems at a higher level. The network server can also include interacting with web pages, and can provide access to a remote system/browser and/or local browser to interface with the welder. The remote system can include at least one standard socket (e.g., HTTP) for web communications and at least one custom socket (e.g., Welding Application Socket) to exchange information between the welder and the remote system. For example, the standard socket can be an HTTP socket, an FTP socket, a TELNET socket, and/or other network socket. The standard socket enables the remote system to load a variety of applications and/or tools that facilitate system performance and access to the applications and/or tools. For example, the applications may invoke or bootstrap Welding Application sockets that encapsulate a welding system's native addressing and command arguments, wherein suitable routing and request arguments may be served by a welder's native network and operating system. The network can employ User Datagram Protocol (UDP) protocol, wherein a client system can proxy requests over the socket to/from a welder's native system. The welder's native system can include one or more control processors and a native welding Local Area Network (LAN) connecting the control processors with one or more logical processes and/or "objects" executing on the control processor. A database can be used to provide access to methods/properties exhibited by each object.

As shown in FIG. 5, a distributed welding architecture 100 includes a welding system 110 that includes one or more welders 1–N, N being an integer, that are operatively coupled to a remote system or interface 130 via a network 120. The remote system 130, which can be a computer or other welding system interacts with the welding systems of the plurality of welders by invoking weld objects that provide functional interaction with various aspects of the welding system. These aspects can include controlling, monitoring and/or communicating with the welding system. Communications are provided by a server and/or network interface and can include a collection, group, and/or cluster of servers and/or clients. The server and/or network interface can include a web server or servers that provides remote browsing interactivity with the welding system. An embedded web browser can be provided that may act as a client to other remote systems or welders. Other client functionality within the welding system can include an e-mail sender (e.g., SMTP client) to send messages to other network systems. Other portions of the welding system 100 can include a weld system monitor, a weld control system that controls welding equipment and/or other components. The welding equipment is the physical hardware producing the weld such as a wire feeder, contact tip, welding gun, dresser, gas mixer, gas sneezer, gas controller, clamp actuator, travel carriage/part manipulator, robot arm/beam/torch manipulator, laser seam tracker, and/or other input/output devices, and/or a welding power source. The weld control system can include a weld controller, an arc/weld monitor, and weld I/O and communications interface to control the welding equipment and/or other components.

By coupling the welding systems 110 to the network 120, a higher level of control and efficiency is established over conventional welding systems. The network 120 can include broad public networks such as the Internet or can be configured for local Intranet and/or dedicated control networks. As an example, the network 120 can employ Ethernet (IEEE 802.3), Wireless Ethernet (IEEE 802.11), PPP (point-to-point protocol), point-to-multipoint short-range RF (Radio Frequency), WAP (Wireless Application Protocol) and/or Bluetooth. Higher-level control and monitoring is achieved by executing remote components within the remote system to monitor and/or control various aspects within the welding systems. These components can include a remote interface, a weld configuration component, a weld monitoring component that can include an arc stability monitor, a weld quality monitor, and/or an energy monitor. Other remote components can include a higher-level control component, a business transaction component, etc. The remote interface, which can include a browser, enables users to remotely monitor, configure and/or control the welding systems. The remote interface can be designed to load one or more of the weld objects which can be configured as an applet, etc., which in turn can utilize web pages that are served by the server and/or network interface and invoke one or more public domain and/or custom sockets to facilitate communications with the welding systems. Remote configuration of the welding system 100 enables weld designers and engineers to upgrade or modify various aspects of the welding system from remote locations. These aspects can include upgrading or modifying procedures, firmware and/or programs associated with the weld control system. The remote interface can access a database containing programs and/or firmware and/or provide a configuration screen (e.g., Graphical User Interface) to facilitate the upgrade. The remote interface can be designed to also enable engineers to manipulate logic, timing, waveform and/or dynamic behavior within the weld control system.

The weld monitoring component enables remote monitoring and/or logging of production and/or control information from the welding systems, provides this information to the remote interface and logs the information to a database. This can be achieved by aggregating a plurality of welding system variables (e.g., query each welding system for monitored variables, receive event messages) from the welding systems. These variables can be provided by the weld system monitor and the arc/weld monitor. The arc/weld monitor monitors control aspects of the welding control system such as, but not limited to, feedback, counters, energy consumption, timers, and/or other variables that reflect the state of the weld control system, welding supply usage (e.g., gas usage, wire usage, etc.) that have been consumed during a particular time interval, quality control monitoring (e.g., arc stability feedback from the arc/weld monitor, etc.), receive alarms and/or other events that are triggered from the monitored variables. The higher-level control component facilitates in controlling and/or coordinating one or more remote welding systems. This can be achieved by directing synchronous and/or asynchronous commands to the weld control system and monitoring command execution results via the weld monitoring component. These commands can be directed via a weld command protocol that utilizes a datagram socket and/or a stream socket to interact with control functions in the welding systems 110.

As shown in FIG. 5, distributed welding architecture 100 illustrates an exemplary network configuration in accordance with the present invention. The distributed welding architecture 100 includes one or more welders 110 designed with a network server and/or interface. It is noted that the welders can also be included within a network of welders. Each welder can be designed to communicate over network 120 to a plurality of network enabled devices. These devices can include a local interface 130 such as a computer and/or a remote interface 140 and/or other network capable device (e.g., a programmable logic controller, a robot, TCP device, etc.). The network enabled devices can open one or more welding protocol sockets or network sockets and execute components or objects, such as an applet, to facilitate direct and timely access to the welders 110. Each welder can include program components to control and/or monitor the welders and can utilize a plurality of welding protocol sockets to communicate with the program components and the network enabled devices. The welding protocol sockets can also facilitate communications between welders wherein one welder acts as a client and another welder acts as a server or vice versa. The distributed welding architecture 100 can be integrated in an overall distributed architecture of plant floor control. This enables the welding process as well as other processes to be monitored and controlled from one or more remote locations without sending systems engineers or operators to each process station to modify or diagnose the operating conditions of the welders. As can be appreciated, various types of welding system integration can be utilized. Several of these systems are disclosed in U.S. Pat. Nos. 6,486,439 and 6,624,388, As such further details concerning the integration of one or more welders will not be further described.

As shown in FIG. 5, the network 120 communicates with an electrical demand management application (EDMA) 150. The EDMA is designed to receive and monitor electrical consumption data from welders 110. This information can be transmitted to local interface 130 via the network and/or to remote interface 140 via the internet 160. Other information can be transmitted and/or received via the network and/or internet such as information relating to the facility electrical power meter 170 and/or information from other LANs 180.

As represented in FIG. 5, information from one or more welders is communicated to the EDMA. The EDMA is typically a software program; however, it may be part of an integrated hardware system and/or other system. The information from welders 110 received by the EDMA typically includes the amount of current consumed; however, other information can be received such as time of use, various types of priority protocols, etc. This information from the welders is used by the EDMA in conjunction with information obtained by one or more information sources such as local interface 130, remote interface 140, facility electrical power meter 170, and/or information from other LANs 180 to control the operation of one or more welders. For instance, the information received from these one or more information sources is then processed by the EDMA to determine whether one or more welders 110 should be cycled on or cycled off so as to maintain a desired energy consumption profile for one or more welding systems. As can be appreciated, the EDMA can be used alone or in conjunction with one or more welding control systems, such as described in U.S. Pat. Nos. 6,486,439 and 6,624,388.

Referring now to FIG. 6, one non-limiting control system which can be utilized by the EDMA is illustrated. As shown in FIG. 6, the EDMA can be designed to initially receive electrical demand information from each welder on one or more LANs. This electrical demand information is then summed to establish a group total for a particular welding system on a LAN. As can be appreciated, all the welders on a particular LAN or two or more welders on a LAN can be grouped together based upon the desired sophistication and/or desired control structure for a particular welding system. The summed information relating to electrical demand is then compared to a demand reference limit. This demand reference limit can be established by a user via a local interface 130 and/or a remote interface 140. If the sum of the electrical demands is greater than the maximum demand value, the EDMA will generate a signal to one or more welders on the LAN to cause one or more of the welders to cycle into the off position so as to reduce the total electrical demand being used by a group of welders. The particular welders which are signaled to cycle from the on to the off position can be determined based upon one or more criteria, or may just be shut off upon receipt of a cycle off signal from the EDMA. When the electrical demand total is less than the group electrical limit, the EDMA can be designed to obtain information from the facility electrical power meter concerning the current electrical demand of a facility. If the current electrical demand is greater than the demand limit, the EDMA can be designed to shut down one or more welders and/or one or more facilities so as to cause the facility demand to drop to or below the demand limit for the facility. As can be appreciated, this demand limit for the facility can be entered via local interface 130 and/or remote interface 140. As illustrated in FIG. 5, the facility demand may be based solely on the welders in a facility such as one group of welders 110 connected to network 120, or can include one or more other groups of welders that supply electrical demand information to the EDMA via LANs 180. As can be appreciated, the facility demand can be expanded beyond the welders in the facility to also include lighting, air conditioning, and/or any other device that consumes electrical energy in a facility.

Referring again to FIG. 6, once the EDMA cycles off a sufficient number of welders such that the total electrical demand for a facility is within the set budget level, the EDMA logs the power usage for the facility for statistical purposes. This information can be displayed on one or more interfaces to show real time and/or historical time data related to energy consumption by the facility. In addition, the EDMA can be used to predict future and/or anticipated energy consumption by a facility so as to provide better control for a facility to reduce downtime and/or other costs in a facility during production. The logged data can occur continuously or at certain time intervals or during certain events. As shown in FIG. 6, if the amount of electrical demand at the facility is below the set budget level, the EDMA can be designed to send a signal to cycle one or more welders from an off to an on cycle even though an earlier algorithm determined that the energy consumption by a particular group of welders exceeded a particular group limit at a particular time. As can be appreciated, many other control systems can be incorporated in the EDMA to provide energy monitoring functions and/or control functions based upon the energy consumption of one or more welders and/or other electrical energy consuming devices.

What has been described above are various aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

We claim:

1. A welding control system to monitor the energy consumption of a plurality of welders comprising a plurality of energy monitoring devices and a controller designed to receive data from said plurality of energy monitoring devices, each of said energy monitoring devices monitoring energy consumption from at least one of said welders, said controller generating information concerning energy consumption of a plurality of said welders, said controller preventing or delaying a startup of at least one welder if such startup of such welder will cause said monitored energy consumption of said monitored welders to exceed a predefined value.

2. The welding system as defined in claim 1, wherein said information concerning energy consumption generated by said controller includes real time information relating to energy consumption of a single welder, real time information relating to energy consumption of a plurality of welders, historical information relating to energy consumption of a single welder, historical information relating to energy consumption of a plurality of welders, information relating to future energy consumption of a single welder, information relating to future energy consumption of a plurality of welders, or combinations thereof.

3. The welding system as defined in claim 2, wherein said controller includes a computer, said computer including hardware to generate information relating to energy consumption of at least one welder, software to generate information relating to energy consumption of at least one welder, or combinations thereof.

4. The welding system as defined in claim 3, wherein a plurality of energy monitoring devices are designed to send data to said controller by an IR transmitter, a RF transmitter, a microwave transmitter, a phone line, computer cable, an electric wire, a fiberoptic cable, a USB cable, a coaxial cable, or combinations thereof.

5. The welding system as defined in claim 4, wherein a plurality of energy monitoring devices send data to said controller via an ethernet.

6. The welding system as defined in claim 2, wherein a plurality of energy monitoring devices are designed to send data to said controller by an IR transmitter, a RF transmitter, a microwave transmitter, a phone line, computer cable, an electric wire, a fiberoptic cable, a USB cable, a coaxial cable, or combinations thereof.

7. The welding system as defined in claim 2, wherein said controller generates a signal to activate, deactivate or combinations thereof at least one welder, said signal is at least partially based on said data from a plurality of said energy monitoring devices.

8. The welding system as defined in claim 2, wherein said controller is networked to at least one other controller, at least one of said controllers sending information to, receiving information from or combinations thereof a master controller.

9. The welding system as defined in claim 2, wherein said controller monitors, controls or combinations thereof at least one operating parameter of at least one welder.

10. The welding system as defined in claim 2, wherein at least one operating parameter of at least one or said welders is at least partially set, changed or combinations thereof by said controller.

11. The welding system as defined in claim 1, wherein said controller includes a computer, said computer including hardware to generate information relating to energy consumption of at least one welder, software to generate information relating to energy consumption of at least one welder, or combinations thereof.

12. The welding system as defined in claim 11, wherein a plurality of energy monitoring devices are designed to send data to said controller by an IR transmitter, a RF transmitter, a microwave transmitter, a phone line, computer cable, an electric wire, a fiberoptic cable, a USB cable, a coaxial cable, or combinations thereof.

13. The welding system as defined in claim 12, wherein said controller generates a signal to activate, deactivate or combinations thereof at least one welder, said signal is at least partially based on said data from a plurality of said energy monitoring devices.

14. The welding system as defined in claim 13, wherein said signal generated by said controller to activate, deactivate or combinations thereof at least one of said welders is at least partially based on current energy demand by a plurality of said welders, anticipated energy demand by a plurality of said welders, energy charge for operating a plurality of said welders during a certain period of time, demand charge for operating a plurality of welders during a certain period of time, or combinations thereof.

15. The welding system as defined in claim 14, wherein said controller is networked to at least one other controller, at least one of said controllers sending information to, receiving information from or combinations thereof a master controller.

16. The welding system as defined in claim 15, wherein said controller monitors, controls or combinations thereof at least one operating parameter of at least one welder.

17. The welding system as defined in claim 16, wherein at least one operating parameter of at least one or said welders is at least partially set, changed or combinations thereof by said controller.

18. The welding system as defined in claim 17, wherein said controller beginning startup of at least one of said welders that has been prevented or delayed from startup when said startup of said welder will not cause said monitored energy consumption to exceed a predefined value.

19. The welding system as defined in claim 17, wherein said controller beginning startup of at least one of said welders, terminating operation of at least one of said welders, or combinations thereof based at least partially on the priority of operation of a particular welder, production criteria for a particular welder in a production process, inventory levels of a particular welder, production quotas of a particular welder, operational status of a particular welder, or combinations thereof.

20. The welding system as defined in claim 5, wherein said controller generates a signal to activate, deactivate or combinations thereof at least one welder, said signal is at least partially based on said data from a plurality of said energy monitoring devices.

21. The welding system as defined in claim 20, wherein said signal generated by said controller to activate, deactivate or combinations thereof at least one of said welders is at least partially based on current energy demand by a plurality of said welders, anticipated energy demand by a plurality of said welders, energy charge for operating a plurality of said welders during a certain period of time, demand charge for operating a plurality of welders during a certain period of time, or combinations thereof.

22. The welding system as defined in claim 21, wherein said controller is networked to at least one other controller, at least one of said controllers sending information to, receiving information from or combinations thereof a master controller.

23. The welding system as defined in claim 22, wherein said controller monitors, controls or combinations thereof at least one operating parameter of at least one welder.

24. The welding system as defined in claim 23, wherein at least one operating parameter of at least one or said welders is at least partially set, changed or combinations thereof by said controller.

25. The welding system as defined in claim 24, wherein said controller beginning startup of at least one of said welders that startup has been interrupted when said startup of said welder will not cause said monitored energy consumption to exceed a predefined value.

26. The welding system as defined in claim 25, wherein said controller beginning startup of at least one of said welders, terminating operation of at least one of said welders, or combinations thereof based at least partially on the priority of operation of a particular welder, production criteria for a particular welder in a production process, inventory levels of a particular welder, production quotas of a particular welder, operational status of a particular welder, or combinations thereof.

27. The welding system as defined in claim 24, wherein said controller beginning startup of at least one of said welders, terminating operation of at least one of said welders, or combinations thereof based at least partially on the priority of operation of a particular welder, production criteria for a particular welder in a production process, inventory levels of a particular welder, production quotas of a particular welder, operational status of a particular welder, or combinations thereof.

28. The welding system as defined in claim 11, wherein said controller generates a signal to activate, deactivate or combinations thereof at least one welder, said signal is at least partially based on said data from a plurality of said energy monitoring devices.

29. The welding system as defined in claim 11, wherein said controller is networked to at least one other controller, at least one of said controllers sending information to, receiving information from or combinations thereof a master controller.

30. The welding system as defined in claim 11, wherein said controller monitors, controls or combinations thereof at least one operating parameter of at least one welder.

31. The welding system as defined in claim 11, wherein at least one operating parameter of at least one or said welders is at least partially set, changed or combinations thereof by said controller.

32. The welding system as defined in claim 1, wherein a plurality of energy monitoring devices are designed to send data to said controller by an IR transmitter, a RF transmitter, a microwave transmitter, a phone line, computer cable, an electric wire, a fiberoptic cable, a USB cable, a coaxial cable, or combinations thereof.

33. The welding system as defined in claim 32, wherein a plurality of energy monitoring devices send data to said controller via an ethernet.

34. The welding system as defined in claim 1, wherein said controller generates a signal to activate, deactivate or combinations thereof at least one welder, said signal is at least partially based on said data from a plurality of said energy monitoring devices.

35. The welding system as defined in claim 34, wherein said signal generated by said controller to activate, deactivate or combinations thereof at least one of said welders is at least partially based on current energy demand by a plurality of said welders, anticipated energy demand by a plurality of said welders, energy charge for operating a plurality of said welders during a certain period of time, demand charge for operating a plurality of welders during a certain period of time, or combinations thereof.

36. The welding system as defined in claim 1, wherein said controller is networked to at least one other controller, at least one of said controllers sending information to, receiving information from or combinations thereof a master controller.

37. The welding system as defined in claim 1, wherein said controller monitors, controls or combinations thereof at least one operating parameter of at least one welder.

38. The welding system as defined in claim 1, wherein at least one operating parameter of at least one or said welders is at least partially set, changed or combinations thereof by said controller.

39. The welding system as defined in claim 1, wherein said controller beginning startup of at least one of said welders that has been prevented or delayed from startup when said startup of said welder will not cause said monitored energy consumption to exceed a predefined value.

40. The welding system as defined in claim 1, wherein said controller beginning startup of at least one of said welders, terminating operation of at least one of said welders, or combinations thereof based at least partially on the priority of operation of a particular welder, production criteria for a particular welder in a production process, inventory levels of a particular welder, production quotas of a particular welder, operational status of a particular welder, or combinations thereof.

41. A method of monitoring the energy consumption of a plurality of welders comprising:
   a) providing at least one energy monitoring device;
   b) at least partially monitoring energy consumption of said plurality of welders by said at least one energy monitoring device;
   c) providing a controller;
   d) sending data from said at least one energy monitoring device to said controller; and,
   e) at least partially controlling at least one of said welders at least partially on information received by said controller, said step of at least partially controlling including the step of preventing or delaying a startup of at least one welder of such startup of such welder will cause energy consumption of said monitored welders to exceed a predefined value.

42. The method as defined in claim 41, wherein said controller generates information concerning energy consumption of a plurality of said welders.

43. The method as defined in claim 42, wherein said information concerning energy consumption generated by said controller includes real time information relating to energy consumption of a single welder, real time information relating to energy consumption of a plurality of welders, historical information relating to energy consumption of a single welder, historical information relating to energy consumption of a plurality of welders, information relating to future energy consumption of a single welder, information relating to future energy consumption of a plurality of welders, or combinations thereof.

44. The method as defined in claim 43, wherein at least one of said energy monitoring devices sends data to said controller by an IR transmitter, a RF transmitter, a microwave transmitter, a phone line, computer cable, an electric wire, a fiberoptic cable, a USB cable, a coaxial cable, or combinations thereof.

45. The method as defined in claim 44, wherein at least one energy monitoring device and said controller are connected via an ethernet.

46. The method as defined in claim 45, including the step of activating, deactivating or combinations thereof at least one welder at least partially based on said data from said energy monitoring devices.

47. The method as defined in claim 46, wherein said step of activating, deactivating or combinations thereof at least one of said welders is at least partially based on current energy demand by a plurality of said welders, anticipated energy demand by a plurality of said welders, energy charge for operating a plurality of said welders during a certain period of time, demand charge for operating a plurality of welders during a certain period of time, or combinations thereof.

48. The method as defined in claim 47, including the step of networking at least two controllers to monitor energy consumption by a plurality of welders.

49. The method as defined in claim 48, wherein said controller monitors, controls or combinations thereof at least one operating parameter of at least one welder.

50. The method as defined in claim 42, including the step of activating, deactivating or combinations thereof at least one welder at least partially based on said data from said energy monitoring devices.

51. The method as defined in claim 42, including the step of networking at least two controllers to monitor energy consumption by a plurality of welders.

52. The method as defined in claim 41, wherein said information concerning energy consumption generated by said controller includes real time information relating to energy consumption of a single welder, real time information relating to energy consumption of a plurality of welders, historical information relating to energy consumption of a single welder, historical information relating to energy consumption of a plurality of welders, information relating to future energy consumption of a single welder, information relating to future energy consumption of a plurality of welders, or combinations thereof.

53. The method as defined in claim 52, including the step of activating, deactivating or combinations thereof at least one welder at least partially based on said data from said energy monitoring devices.

54. The method as defined in claim 53, including the step of networking at least two controllers to monitor energy consumption by a plurality of welders.

55. The method as defined in claim 54, wherein said controller monitors, controls or combinations thereof at least one operating parameter of at least one welder.

56. The method as defined in claim 52, including the step of networking at least two controllers to monitor energy consumption by a plurality of welders.

57. The method as defined in claim 41, wherein at least one of said energy monitoring devices sends data to said controller by an IR transmitter, a RF transmitter, a microwave transmitter, a phone line, computer cable, an electric wire, a fiberoptic cable, a USB cable, a coaxial cable, or combinations thereof.

58. The method as defined in claim 41, wherein at least one energy monitoring device and said controller are connected via an ethernet.

59. The method as defined in claim 41, including the step of activating, deactivating or combinations thereof at least one welder at least partially based on said data from said energy monitoring devices.

60. The method as defined in claim 59, wherein said step of activating, deactivating or combinations thereof at least one of said welders is at least partially based on current energy demand by a plurality of said welders, anticipated energy demand by a plurality of said welders, energy charge for operating a plurality of said welders during a certain period of time, demand charge for operating a plurality of welders during a certain period of time, or combinations thereof.

61. The method as defined in claim 41, including the step of networking at least two controllers to monitor energy consumption by a plurality of welders.

62. The method as defined in claim 41, wherein said controller monitors, controls or combinations thereof at least one operating parameter of at least one welder.

63. The method as defined in claim 41, wherein at least one operating parameter of at least one of said welders is at least partially set, changed or combinations thereof by said controller.

64. The method as defined in claim 41, including the step of beginning startup of at least one of said welders that has been prevented or delayed from startup when startup of said welder will not cause said monitored energy consumption to exceed a predefined value.

65. The method as defined in claim 64, including the step of beginning startup of at least one of said welders, terminating operation of at least one of said welders, or combinations thereof based at least partially on the priority of operation of a particular welder, production criteria for a particular welder in a production process, inventory levels of a particular welder, production quotas of a particular welder, operational status of a particular welder, or combinations thereof.

66. The method as defined in claim 41, including the step of beginning startup of at least one of said welders, terminating operation of at least one of said welders, or combinations thereof based at least partially on the priority of operation of a particular welder, production criteria for a particular welder in a production process, inventory levels of a particular welder, production quotas of a particular welder, operational status of a particular welder, or combinations thereof.

67. A method of controlling the energy consumption of a plurality of energy consuming devices comprising:
   a) obtaining energy consumption information from a plurality of said energy consuming devices;
   b) totaling the energy consumption information of said plurality of said energy consuming devices;
   c) comparing said totalized energy consumption to a reference value; and,
   d) preventing or delaying the startup of operation of at least one one or said energy consuming devices when said totalized energy consumption equals or exceeds said reference value.

68. The method as defined in claim 67, wherein said step of obtaining energy consumption information includes the connection of at least one of said energy consuming devices to an energy consumption monitor.

69. The method as defined in claim 68, wherein said step of totaling the energy consumption includes the used of a microprocessor, a hard wired circuit, a software program or combinations thereof.

70. The method as defined in claim 69, wherein said step of comparing said totalized energy includes the used of a microprocessor, a hard wired circuit, a software program or combinations thereof.

71. The method as defined in claim 70, wherein said energy consumption information includes real time information relating to energy consumption of a single energy consuming device, real time information relating to energy consumption of a plurality of energy consuming devices, historical information relating to energy consumption of a single energy consuming device, historical information relating to energy consumption of a plurality of energy consuming devices, information relating to future energy consumption of a single energy consuming device, information relating to future energy consumption of a plurality of energy consuming devices, or combinations thereof.

72. The method as defined in claim 71, wherein said step of obtaining energy consumption information from a plurality of said energy consuming devices includes coupling a plurality of said energy consuming devices to a network interface to establish a network connection between said plurality of energy consuming devices.

73. The method as defined in claim 72, wherein said step of obtaining energy consumption information from a plurality of said energy consuming devices includes exchange information between a plurality of said energy consuming devices and the remote system.

74. The method as defined in claim 73, including the step of monitoring at least one welding function of a plurality of energy consuming devices and coordinating, controlling or combinations thereof a plurality of said energy consuming devices based at least partially on said monitored energy consuming device functions.

75. The method as defined in claim 68, wherein said step of comparing said totalized energy includes the used of a microprocessor, a hard wired circuit, a software program or combinations thereof.

76. The method as defined in claim 68, wherein said energy consumption information includes real time information relating to energy consumption of a single energy consuming device, real time information relating to energy consumption of a plurality of energy consuming devices, historical information relating to energy consumption of a single energy consuming device, historical information relating to energy consumption of a plurality of energy consuming devices, information relating to future energy consumption of a single energy consuming device, information relating to future energy consumption of a plurality of energy consuming devices, or combinations thereof.

77. The method as defined in claim 68, wherein said step of obtaining energy consumption information from a plurality of said energy consuming devices includes coupling a plurality of said energy consuming devices to a network interface to establish a network connection between said plurality of energy consuming devices.

78. The method as defined in claim 68, wherein said step of obtaining energy consumption information from a plurality of said energy consuming devices includes exchange information between a plurality of said energy consuming devices and the remote system.

79. The method as defined in claim 68, including the step of monitoring at least one welding function of a plurality of energy consuming devices and coordinating, controlling or combinations thereof a plurality of said energy consuming devices based at least partially on said monitored energy consuming device functions.

80. The method as defined in claim 67, wherein said step of totaling the energy consumption includes the used of a microprocessor, a hard wired circuit, a software program or combinations thereof.

81. The method as defined in claim 80, wherein said step of comparing said totalized energy includes the used of a microprocessor, a hard wired circuit, a software program or combinations thereof.

82. The method as defined in claim 80, wherein said energy consumption information includes real time information relating to energy consumption of a single energy consuming device, real time information relating to energy consumption of a plurality of energy consuming devices, historical information relating to energy consumption of a single energy consuming device, historical information relating to energy consumption of a plurality of energy consuming devices, information relating to future energy consumption of a single energy consuming device, information relating to future energy consumption of a plurality of energy consuming devices, or combinations thereof.

83. The method as defined in claim 80, wherein said step of obtaining energy consumption information from a plurality of said energy consuming devices includes coupling a plurality of said energy consuming devices to a network interface to establish a network connection between said plurality of energy consuming devices.

84. The method as defined in claim 80, wherein said step of obtaining energy consumption information from a plurality of said energy consuming devices includes exchange information between a plurality of said energy consuming devices and the remote system.

85. The method as defined in claim 80, including the step of monitoring at least one welding function of a plurality of energy consuming devices and coordinating, controlling or combinations thereof a plurality of said energy consuming devices based at least partially on said monitored energy consuming device functions.

86. The method as defined in claim 67, wherein said step of comparing said totalized energy includes the used of a microprocessor, a hard wired circuit, a software program or combinations thereof.

87. The method as defined in claim 67, wherein said energy consumption information includes real time information relating to energy consumption of a single energy consuming device, real time information relating to energy consumption of a plurality of energy consuming devices, historical information relating to energy consumption of a single energy consuming device, historical information relating to energy consumption of a plurality of energy consuming devices, information relating to future energy consumption of a single energy consuming device, information relating to future energy consumption of a plurality of energy consuming devices, or combinations thereof.

88. The method as defined in claim 67, wherein said step of obtaining energy consumption information from a plurality of said energy consuming devices includes coupling a plurality of said energy consuming devices to a network interface to establish a network connection between said plurality of energy consuming devices.

89. The method as defined in claim 67, wherein said step of obtaining energy consumption information from a plurality of said energy consuming devices includes exchange information between a plurality of said energy consuming devices and the remote system.

90. The method as defined in claim 67, including the step of monitoring at least one welding function of a plurality of energy consuming devices and coordinating, controlling or combinations thereof a plurality of said energy consuming devices based at least partially on said monitored energy consuming device functions.

91. The method as defined in claim 67, including the step of beginning startup of at least one of said energy consuming devices that has been prevented or delayed from startup when startup of said energy consuming devices will not cause said monitored energy consumption to exceed a predefined value.

92. The method as defined in claim 91, including the step of beginning startup of at least one of said energy consuming devices, terminating operation of at least one of said energy consuming devices, or combinations thereof based at least partially on the priority of operation of a particular energy consuming device, production criteria for a particular energy consuming device in a production process, inventory levels of a particular energy consuming device, production quotas of a particular energy consuming device, operational status of a particular energy consuming device, or combinations thereof.

93. The method as defined in claim 67, including the step of beginning startup of at least one of said energy consuming devices, terminating operation of at least one of said energy consuming devices, or combinations thereof based at least partially on the priority of operation of a particular energy consuming device, production criteria for a particular energy consuming device in a production process, inventory levels of a particular energy consuming device, production quotas of a particular energy consuming device, operational status of a particular energy consuming device, or combinations thereof.

94. An apparatus to control the energy consumption of a plurality of welders comprising at least one energy monitor to monitor the energy consumption information of said plurality of welders, a controller that totalizes the energy consumption information of a plurality of said welders and compares the totalized energy consumption to a reference value, said controller creating an operating signal to prevent or delay startup of at least one of said welders when said totalized energy consumption equals or exceeds said reference value.

* * * * *